March 5, 1940.  F. KONN  2,192,749
CONTROL SYSTEM
Filed June 20, 1939
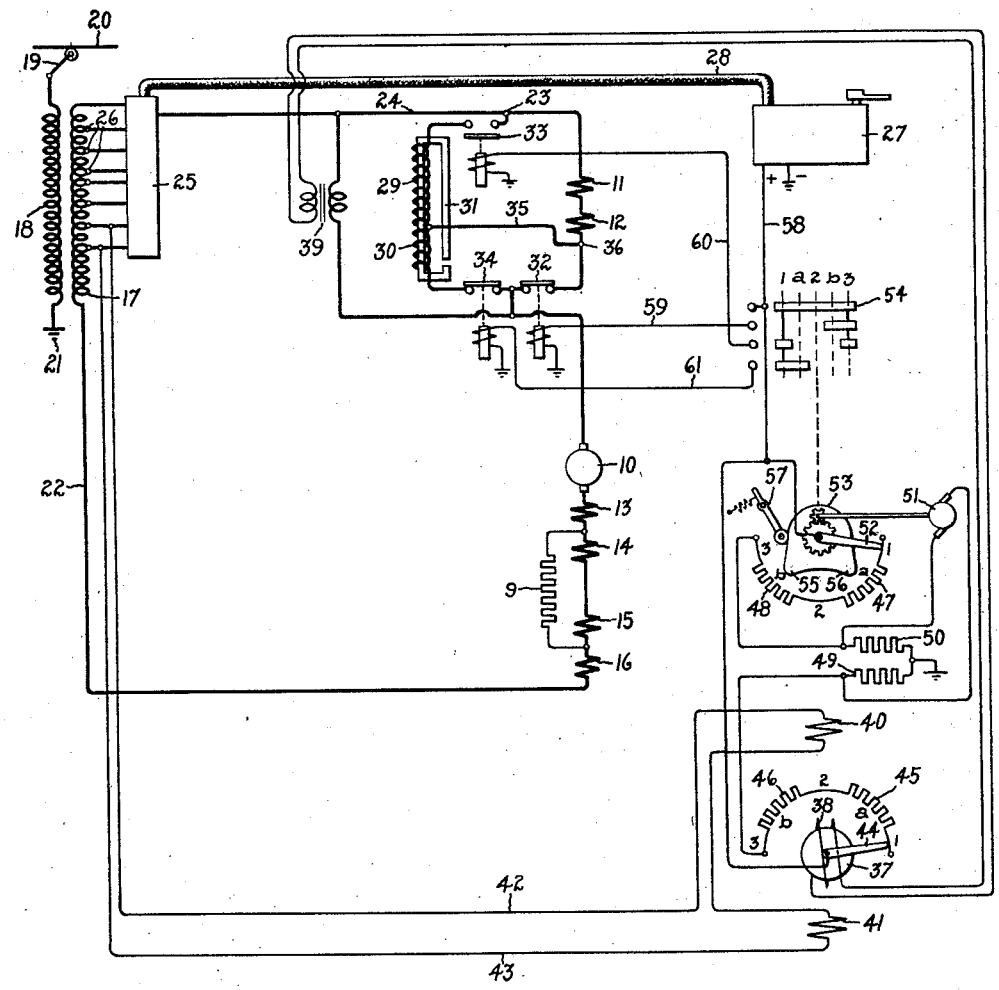
Inventor:
Felix Konn,
by Harry E. Dunham
His Attorney.

Patented Mar. 5, 1940

2,192,749

UNITED STATES PATENT OFFICE 2,192,749

CONTROL SYSTEM

Felix Konn, Erie, Pa., assignor to General Electric Company, a corporation of New York Application June 20, 1939, Serial No. 280,105

6 Claims. (Cl. 172—276)

My invention relates to control systems for electric motors, more particularly to a system for controlling the acceleration of single-phase alternating-current railway motors, such as used in electric locomotives, and has for an object the provision of a simple and reliable control system of this character.

For satisfactory operation of alternating-current motors of the commutating type, it is necessary to control the ratio between the strength of the quadrature component of the interpole flux and the strength of the exciting field in accordance with the motor speed to prevent undue arcing at the brushes by neutralizing the quadrature element of commutation. To this end a scheme has been utilized in which the reactance of a shunt circuit across the interpole winding is changed in a series of steps in accordance with motor speed. A given reactance value sets a certain strength of the quadrature component of the interpole flux giving one speed of perfect neutralization. As the motor speed departs from this speed of perfect neutralization, overcompensation (at higher speeds) or undercompensation (at lower speeds) occurs and when this becomes too pronounced, the condition has been corrected by changing the reactance of the shunt circuit to the next higher or lower step to get a new, higher or lower speed of perfect neutralization, and so on.

It is now proposed, since the speeds of perfect neutralization are determined only by the ratio between the strength of the exciting field and the strength of the quadrature component of the interpole flux, to leave the interpole field shunt circuit unchanged and modify the exciting field strength in accordance with motor speed. In addition, to obtain the advantages of higher speed operation at reduced armature current while simultaneously maintaining a proper ratio of exciting field strength and interpole field strength, it is proposed to boost the exciting field strength above the normal full field values. The exciting field is boosted through an auto-transformer circuit which is made to function automatically at the proper speed by a speed-responsive means.

Accordingly, I have provided an inductive shunt winding which shunts the exciting field winding and which is first connected as an ordinary shunt for low speed operation, then is disconnected for normal full field, intermediate speed operation, and then is connected for autotransformer operation to boost the exciting field at high speeds. The switching means which control the various connections above are operated at the proper time by a speed-responsive relay. Any change in the exciting field strength, whether obtained by shunting or by boosting, results in a new commutation speed setting and dispenses with the need of a change in the interpole or commutating setting, provided that the exciting field is either progressively increased from low to high speed or progressively decreased from high speed to low speed, and provided that the successive changes in the exciting field strength are made at somewhere near the correct speed for the changes.

For a more complete understanding of my invention, reference should now be had to the accompanying drawing, the single figure of which shows in diagrammatic form a system of control embodying my invention.

I have shown my invention in one form as applied to the control of a single-phase alternating-current motor drive for an electrical vehicle, such as an electric locomotive. The single-phase alternating-current traction motor 10 is provided with series exciting field windings 11 and 12, compensating field windings 13 and 16, and interpole or commutating series field windings 14 and 15, the last-named windings being shunted by a resistance 9. The motor and its windings are arranged to be energized from the secondary winding 17 of a supply transformer, the primary winding 18 of which is connected by means of a trolley or pantograph 19 to a trolley wire 20. The other terminal of the primary winding 18 is connected to ground as indicated by the reference numeral 21. One terminal of the secondary winding 17 is connected by a conductor 22 directly to one terminal of the motor 10, the motor being connected with its field windings in series relation with each other. The opposite terminal 23 of the series motor circuit may be connected by means of a conductor 24 and suitable switches indicated generally by the block space 25 selectively to a plurality of taps 26 on the secondary winding 17 so as to apply selected voltages to the motor circuit to give the desired acceleration and speed control.

Preferably the switches 25 are electropneumatically operated. They are controlled by a suitable manually operated controller having suitable contact segments indicated by the block space 27, the electrical connections with the switches 25 being through suitable conductors indicated by a cable 28. The voltage control of the motor 10 through the switching means 27 and 25, for example, may be substantially as described and claimed in the U. S. Patent No. 2,064,637 to John F. Tritle, issued December 15, 1936. It should also be understood that, although I have shown but a single motor 10, the motor circuit may include any number of motors or pair of motors desired, and therefore, I do not wish to be limited to the single motor shown.

In carrying out my invention, I provide means for obtaining three values of excitation for the exciting field windings 11 and 12. This means comprises a pair of inductive shunt windings 29 and 30 connected in series and in mutually inductive relationship, the windings 29 and 30 preferably being wound on an iron core 31. The switches 32, 33, and 34 are provided for making the proper connection to obtain the three values of excitation for the exciting windings 11 and 12.

The lowest value of field excitation is given by closing the switches 32 and 33, and opening the switch 34. In this manner, the inductive winding 29 is connected in parallel with the exciting field windings 11 and 12 in a circuit which extends from the terminal point 23 through the switch 33, the inductive winding 29 and by a permanent connection 35 to a terminal point 36 at the other side of the exciting windings 11 and 12. The intermediate value of field excitation, which here is the normal full field value, is obtained by closing the switch 32 and opening the switches 33 and 34. In this manner, the full armature current flows through the exciting windings 11 and 12. The highest value of field excitation is obtained by connecting the inductive windings 29 and 30 for auto-transformer operation, and so boosting the exciting field current to a value greater than the armature current. To obtain this boosted field excitation, the switch 32 is opened and the switches 33 and 34 closed. Thus, the low-voltage primary terminals of the auto-transformer and the low-voltage winding 30 are connected in series with the motor armature, and the high-voltage or secondary terminals of the transformer and the high-voltage winding 29 are connected across the exciting field windings 11 and 12. With this connection, more current is forced through the exciting field windings 11 and 12 than flows through the armature, and a boosted exciting field results.

The switches 32, 33 and 34 are controlled automatically in response to the speed of the locomotive, or more specifically, the speed of the motor 10 as evidenced by the electrical conditions of this motor, by means of a speed-responsive device 37, preferably of the type described in U. S. Patent No. 1,972,688 to Jacob W. McNairy and Franklin H. Pritchard, issued September 4, 1934. The speed-responsive device 37 has a rotor winding 38 which is connected through a transformer 39, having preferably a 1 to 1 ratio, across the exciting field windings 11 and 12. The relay 37 is also provided with stator windings 40 and 41 which are connected in series with each other and through the conductors 42 and 43 to two selected taps on the secondary winding 17 whereby the stator windings are given a predetermined excitation. The rotor element of the relay 37 carrying the winding 38 is mechanically connected to operate a contact arm 44. The rotor of the relay 37 and its contact arm 44 will take a position corresponding to the speed of the locomotive.

As shown, the contact arm 44 is in fact a pointer of a light rheostat which gives mainly three values of resistance over the speed range, counter-clockwise movement of the pointer 44 serving to short out the variable resistance elements 45 and 46. These resistance elements 45 and 46 are balanced in a Wheatstone bridge arrangement including the variable resistance elements 47 and 48 and the fixed resistances 49 and 50, the resistances 47 and 48 being of the same resistance value respectively as the resistance elements 45 and 46. A constant voltage is suitably applied to the Wheatstone bridge, and an electric motor 51 is connected across what would be the galvanometer leg of the bridge. Upon operation of the rheostat pointer 44 to change the balance of the Wheatstone bridge by altering the resistance value of the leg including the variable resistances 45 and 46, the bridge becomes unbalanced and current flows through the motor 51. Motoring operation of this motor occurs in a manner as fully described in U. S. Patent No. 1,821,758, to Felix Konn, issued on September 1, 1931. Simultaneously then, a similar rheostat pointer 52 is driven by the motor 51 to adjust the resistance value of the variable resistances 47 and 48 to balance the bridge.

At the same time a suitable contact-operating drum controller 53 is rotated by the motor 51 to cause switching at the contact segments 54 whereby operation of the switches 32, 33 and 34 is effected in a predetermined manner. Preferably, the cam projections 55 and 56 are provided on a portion of the drum controller 53 for cooperation with a spring biased roller 57. In this manner, three stable positions for the drum are determined. In between these stable positions indicated by the numerals 1, 2 and 3, a pair of transitional positions *a* and *b* are obtained at which transition switching occurs. However, the transition switching positions cannot be maintained since the roller 57 will at that time be riding on the cam projections 55 and 56 and tending to move the drum to a stable position.

The energizing windings of the relays 32, 33 and 34 are supplied from a suitable source of direct current which is preferably connected through the controller 27 to enable the circuits to be de-energized when the controller is in its off position. From the controller 27, the energizing winding of the normally closed relay 32 is connected by a conductor 58, the switching segments 54 of the controller 53 and a conductor 59 through the energizing winding to ground. Similarly, the circuit for the normally open relay 33 includes the conductor 58, the segments 54, a conductor 60 and through the energizing winding to ground. Likewise, the normally closed relay 34 is supplied from the conductor 58, the segments 54, a conductor 61 and through the energizing winding to ground. It will be noted also that the Wheatstone bridge arrangement previously referred to is also connected for energization at one side to the conductor 58 and at the other side to ground.

In operation of the system, manual control of the voltages applied to the motor 10 is effected through operation of the handle of the controller 27. When this handle is turned to its first position, a suitable one of the tap switches 25 is closed to supply a low voltage to the motor as will be understood from the aforesaid Tritle patent. During low speed operation when low voltages are applied, the rotor of the speed-responsive relay 37 maintains a position 1 as shown at which time the drum controller 53 and its switching segments 54 are maintained in the segment position 1. As diagrammatically represented in this position 1, energizing circuits are completed for the normally open relay 33 and the normally closed relay 34. Thus, in position 1, relay 32 remains closed to complete the armature circuit, and relay 34 is opened. Closing of relay 33 completes a shunt circuit for the exciting field windings 11 and 12 through the reactor 29 and the permanent connection 35. At this point a considerable portion of the armature current is diverted from the exciting field windings 11 and 12 through the inductive winding 29 and the permanent connection 35. Thus, the low speed, low excitation circuits for the exciting field windings 11 and 12 are completed and low speed operation of the engine 10 proceeds without danger of undue arcing at the brushes. In other words, a low speed commutation setting has been effected by reducing the excitation of the exciting fields to maintain a predetermined ratio between the strength of the exciting field and the strength of the quadrature component of the interpole flux for a range of low speeds.

As the low speed range is gradually exceeded due to acceleration of the locomotive and further movement of the handle of the controller 27, that speed change will be reflected in a counter-clockwise rotation of the rotor and the pointer 44 of the speed-responsive relay 37. Such rotation of the pointer 44 results in changing the resistance relationship in the Wheatstone bridge. This causes the electric motor 51 to operate until a balance is again achieved through a clockwise rotation of the rheostat pointer 52 which first cuts out a portion of the resistance 47. Simultaneously, the drum controller 53 is rotated clockwise toward its first transition point a at which time the spring biased roller 57 is in engagement with the cam projection 55. At this time transition switching occurs as represented by segment position a. Relay 33 is de-energized and the shunt circuit is opened. Relay 32 remains closed and relay 34 remains open. Thus full armature current is supplied to the exciting field windings 11 and 12 for intermediate speed operation. A higher or intermediate speed commutation setting is then completed.

Simultaneously, the spring roller 57 forces the drum controller 53 into the switching position 2 whether or not the motor 51 would ordinarily drive the controller to this position. Due to the fact that the Wheatstone bridge may be almost balanced at this instant, motoring operation might not occur. In position 2, it is seen that relay 34 is de-energized to close the circuit through inductive winding 30. This has substantially no effect on the operation of the motor 10 but merely constitutes a preferred switching position during the normal full field intermediate speed setting preparatory to boosted field operation.

If it is now desired to increase the speed of the locomotive beyond the intermediate speed just achieved, this may be done by moving the handle of the controller 27 once again in the proper direction. This increase in speed, if sufficient, results in further counter-clockwise rotation of the pointer 44 to the transition position b or beyond. The drum controller 53 and its pointer 52 is rotated clockwise by the motor 51 through its position b whereupon the spring roller 57 is riding the cam projection 56. Transition switching occurs as represented by segment position b. Relay 32 is opened and inductive winding 30 included in series with the armature 10 and exciting field windings 11 and 12. Momentarily the armature current is reduced slightly by the introduction of the series reactance 30. Immediately thereafter, the pointer 52 is operated to its position 3 either by continued operation of the pointer 44 to its position 3 or by the force of the spring roller 57 on the cam projection 56.

The final switching for boosted field, high speed operation then occurs as represented by segment position 3. Relay 33 closes, relay 32 remaining open and relay 34 closed. Winding 30 then constitutes the low voltage primary winding of an auto-transformer connected in series with the armature 10 and the parallel circuits one of which includes the relay 33 and the winding 29 and the other of which includes the exciting field windings 11 and the permanent connection 35. The inductive winding 29 constitutes a high voltage secondary which supplies a circulating current to the exciting field windings 11 and 12 and so boosts their energization above full armature current value. In this manner, a third or high speed commutation setting is achieved in response to increased locomotive speed. Boosted operation of this character is particularly valuable for high speed trains because a given motor torque is developed with a lower armature current where the exciting field strength is boosted, which procures a net improvement in overall efficiency because of the reduction of the losses in the current-carrying parts such as transformer secondary winding 17, conductors 22 and 24, field windings 13, 14, 15 and 16 and interpole shunt 9.

Decelerating operation is now thought to be readily apparent. Decreases in locomotive speed bring about an inverse sequence of operations of the pointer 44 through the points b, 2, a and back to point 1 depending upon the speed. Likewise, corresponding reverse operation of the motor 51 and the pointer 52 occurs through the points b, 2, a and 1 to cause step-by-step operation of the switching segments 54 through the same points.

Although I prefer to maintain the interpole shunt connections the same throughout the three speed settings described to minimize the requisite switching circuits, obviously changes of the interpole shunt impedance also may be made in addition to the exciting field adjustments without departing from the scope of my invention. Furthermore, I do not wish to be limited specifically to three speed settings for the exciting field since a lesser or greater number of settings may be utilized.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. The combination in a system of control for an alternating current electric motor provided with an armature, a series field winding and a commutating field winding of means for reducing the excitation of the series field winding at starting and low speeds, means for raising the excitation of the series field winding to a boosted current value of greater magnitude than the current through the armature, and means for controlling said excitation reducing and boosting means responsive to an electrical condition of said motor to provide a plurality of commutation speed settings with a predetermined commutating field winding setting, thereby minimizing the need for varying the commutating field setting.

2. The combination in a system of control for an alternatng current electric motor provided with an armature, a series field winding and a commutating field winding of means for reducing the excitation of the series field winding at starting and low speeds, means for supplying full armature current excitations to said series field winding at intermediate speeds, means for raising the excitation of the series field winding to a boosted current value of greater magnitude than the current through the armature, and means for controlling said excitation reducing, supplying and boosting means responsive to an electrical condition of said motor to provide a plurality of commutation speed settings with a predetermined commutating field winding setting, thereby minimizing the need for varying the commutating field setting.

3. The combination in a system of control for an alternating current electric motor provided with an armature and a series field winding of means for reducing the excitation of the field winding at starting and for increasing the field strength to a boosted value in steps dependent upon the speed of the motor comprising an inductive shunt winding arranged to be connected in parallel with said field winding, a second inductive winding in series circuit with said shunt winding and arranged to be connected to said armature, a first switching means for connecting said shunt winding in parallel with said field winding to reduce the excitation thereon at starting, said first switching means being operable for disconnecting said shunt winding to supply full excitation to said field winding, a second switching means for connecting said shunt winding and said inductive winding with said field winding to supply a current to said field winding of greater magnitude than the current through said armature, and means responsive to the speed of said motor for controlling the operation of said first and said second switching means.

4. The combination in a system of control for an alternating electric current motor provided with an armature and a series field winding of means for controlling the excitation of said field winding comprising an inductive shunt winding arranged to be connected in parallel with said field winding, another inductive winding in series circuit with said shunt winding and in mutually inductive relation therewith, a first switching means operable to connect said shunt winding in parallel with said field winding for reducing the excitation thereon at starting and operable to disconnect said shunt winding for supplying full armature current or normal excitation to said field winding, a second switching means operable to connect said other inductive winding and said shunt winding with said armature whereby said shunt winding and said other inductive winding constitute an auto-transformer for supplying a boosted current to said field winding of greater magnitude than the current to said armature, and means responsive to the speed of said motor for controlling the operation of said first and said second switching means sequentially for supplying reduced excitation, normal excitation and boosted excitation to said series field winding progressively at predetermined increasing speeds.

5. The combination in a system of control for a single-phase alternating current traction motor provided with an armature, a series field winding, and a series connected commutating winding of an auto-transformer having a winding, a first switching means for connecting one end of said auto-transformer winding with one end of said series field winding, a second switching means for connecting the other end of said auto-transformer winding in circuit with said armature, a permanent connection from an intermediate point on said auto-transformer winding to the other end of said series field winding, a third switching means for connecting said other end of said series field winding in circuit with said armature independently of said permanent connection, said first and said third switching means when closed placing a portion of said auto-transformer winding in parallel with said series field wnding for supplying a low value of excitation to said series field winding, said third switching means when closed supplying full excitation to said series field winding, said first and second switching means when closed supplying by auto-transformation a current to said series field winding of greater magnitude than the current through said armature, and means responsive to motor speed for controlling the operation of all of said switching means.

6. The combination in a system of control for a single-phase alternating current traction motor provided with an armature, a series field winding, and a series connected commutating winding of an auto-transformer having a winding, a first switching means for connecting one end of said auto-transformer winding with one end of said series field winding, a permanent connection from an intermediate point on said auto-transformer winding to the other end of said series field winding, a second switching means for connecting the other end of said auto-transformer winding in circuit with said armature, a third switching means for connecting said other end of said series field winding in circuit with said armature independently of said permanent connection, said first and said third switching means when closed placing a portion of said auto-transformer winding in parallel with said series field winding for supplying a low value of excitation to said series field winding, said third switching means when closed supplying full excitation to said series field winding, said first and second switching means when closed supplying by auto-transformation a boosted value of current to said series field winding of greater magnitude than the current through said armature, and means responsive to motor speed for controlling the operation of all of said switching means progressively with increasing speeds as follows: said first and third switching means being closed and said second switching means opened for low speed operation, said first switching means being opened in the transition to intermediate speed operation, said second switching means then being closed for intermediate speed operation, said third switching means being opened in the transition to high speed operation, and then said first switching means being closed for high speed operation.

FELIX KONN.